(No Model.)
G. W. WICKS.
FOUNTAIN TRAP.
No. 359,759. Patented Mar. 22, 1887.
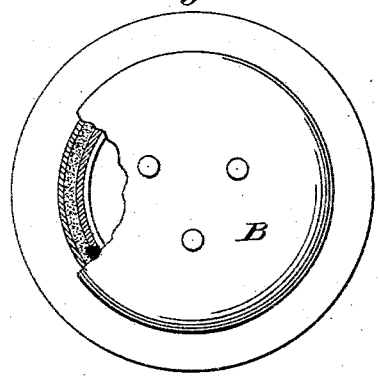
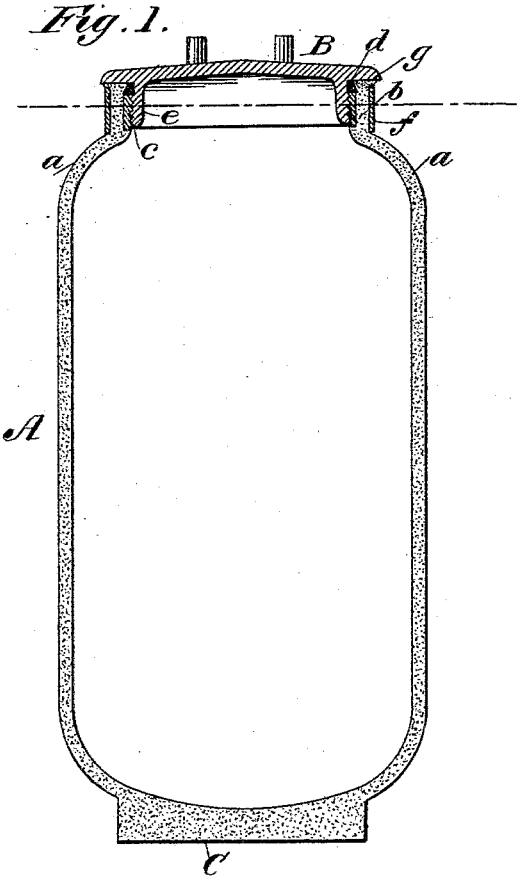
Witnesses
H. F. Parker.
W. E. Bowen.
Inventor
George W. Wicks,
By J. Ell. Bowen
Attorney.

UNITED STATES PATENT OFFICE.

GEORGE W. WICKS, OF BROOKLYN, NEW YORK, ASSIGNOR TO ARCHIBALD E. McKECHNIE, OF LYNN, MASSACHUSETTS.

FOUNTAIN-TRAP.

SPECIFICATION forming part of Letters Patent No. 359,759, dated March 22, 1887.

Application filed February 10, 1886. Renewed January 31, 1887. Serial No. 226,027. (No model.)

*To all whom it may concern:*

Be it known that I, GEORGE W. WICKS, a citizen of the United States, and a resident of Brooklyn, in the county of Kings and State of New York, have invented certain new and useful Improvements in Fountain-Traps, of which the following is a specification.

This invention relates to what are known as "plumbers' traps," intended for use in connection with water-closets, sinks, and analogous receptacles, for the purpose of forming a liquid seal between the receptacle with which it is combined and the soil or drain pipes.

The object of the present invention is to improve that type of the plumbers' trap having the shape of an elongated cylindrical vessel. This type of trap has usually been made by hand, its shape being given it by the artificer by the use of the ordinary tools for producing hollow bodies in lead.

In the production of the trap forming the subject of this application I make use of a newly-devised method and apparatus, which I have embodied in independent applications for patents, filed in the United States Patent Office of even date with filing of this application, and to which reference is here made for a full and exact description of the mode of manufacture.

The invention forming the subject-matter of the present application consists in re-enforcing the mouth of the trap by the employment of an annular metallic washer seated upon a screw-threaded nut which is secured in the mouth of the trap, the two forming a surface of metal harder than the body of the trap, and by the employment of a metallic ring upon the outside of the rim of the mouth of the trap, the upper edge of which is embedded in the soft metal of the trap, which forms a seat for the cover, all as hereinafter described, and illustrated in the accompanying drawings.

In the accompanying drawings, which form part of this description, and in which like features are indicated by like letters, Figure 1 is a sectional elevation of a trap, with its cover, embodying my invention; and Fig. 2 is a top plan view, partly in section, the section being through line $x\ x$ of Fig. 1.

In the claims at the end of this specification I have specified the novel features for which I desire protection.

Referring to the drawings, the letter A designates the body of the trap, and B its cover. The trap is of an elongated cylindrical form, and is made of lead, while the cover is of brass.

In the process of manufacture the body of the trap is cast in a mold, and when taken from the mold the upper end or unformed mouth is of the same diameter as the body, and the bottom has formed on it the projection C, which extends from the center of the bottom a short distance below the rounding body and is of less diameter than said body. The purpose of the projection C is to provide a substantial seating-surface for the trap, so that it will not be liable to be moved by accident or otherwise, and thus disturb the connecting-joints when placed in operative position, with the inlet and outlet pipes secured thereto. The depth of the projection C need be only sufficient to afford a reliable seating-surface.

The core upon which the trap-body is cast is of such a shape as to produce in the interior of the bottom of the trap a curved or concave surface, the object of which is to facilitate the flow of the fluids through the trap and prevent adhesion thereto of any of the solid or semi-solid matters contained in the fluids.

The mouth of the trap is brought to the shape shown in Fig. 1 of the drawings by means of a suitable shaping apparatus—such, for instance, as shown in my application hereinbefore referred to. In shaping the shoulders $a\ a$ and neck $b$ the screw-threaded female nut $c$, of brass, is at the same time secured in position, which is done by placing the nut $c$ upon a suitable expansible mandrel, which is inserted into the open mouth of the trap, and the neck $b$ compressed and molded upon and around the said nut. The preferred method of making this connection between the mouth of the trap and the nut $c$ is fully set forth in my said applications before mentioned.

The metallic washer $d$, whose office is to re-enforce the exposed inner edge of the mouth of the trap, may be secured in position at the same time with the nut c, or by a separate manipulation, if found more economical. It will be observed that the washer d has its outer surface, which is in contact with the lead, inclined or beveled. The object of this is to give support to the lead at the upper end of the neck by spreading it slightly at that point, as clearly shown in the drawings. It also slightly increases the exposed surface of the lead upon which the brass cover B rests when placed in position. Another important function of this construction is, that the washer d prevents the lead at the inner edge of the mouth of the trap from being worn away or compressed out of shape by the repeated removing and replacing of the cover B. I thus prevent any liability of leakage of sewer-gas through the cover, as the inner surface of the cover inside the flange e is compressed tightly when the cover is in place against the top surface of the neck b, whose inner edge is prevented from becoming ragged or worn by the washer d, as described.

Upon the outside of the neck b, I employ a thin but sufficiently rigid metallic ring, f, which may be so shaped at its bottom as to readily conform to the upper extremity of the shoulders a a, upon which it rests, as shown in the drawings. This ring f extends almost to the top of the neck b, as shown, the purpose being to leave the outer edge of said neck unprotected, so that when the cover B is screwed into position the flange g of the cover will slightly compress the lead of said edge of the neck onto the ring f. By this means a secure lead-packed joint is produced at the point designated, and the lead at that point is prevented from becoming unduly worn away by the hard metal foundation afforded by the ring f.

The cover B is provided with the usual wrench-pins, to facilitate its attachment to and disconnection from the trap.

By my method of manufacture the trap can be made of considerably less weight than the hand-made trap, and hence its cost of production is greatly lessened.

In this style of trap it is understood, of course, that the inlet and outlet pipes may be inserted in a direct line, one above the other, or in any other suitable relation, one to the other, according to the position the trap is to occupy with reference to the structure to which it is connected.

The traps will be made of the several standard sizes.

Having thus described my invention, what I claim as new, and desire to secure by Letters Patent, is—

1. A soft-metal plumber's trap the mouth of whose cleaning-out opening is provided with a female screw-threaded nut and with a fixed annular metallic washer embedded above said nut, securing it in position, and in conjunction therewith forming a continuous surface of metal harder than the body of the trap, substantially as described.

2. A soft-metal plumber's trap the mouth of whose cleaning-out opening is provided with a female screw-threaded nut and with a fixed annular metallic washer embedded above said nut, and having its outer surface beveled or inclined for securing the nut in position, said nut and washer forming a continuous surface of metal harder than the body of the trap, substantially as and for the purpose set forth.

3. A soft-metal plumber's trap whose cleaning-out opening is provided on its interior with an embedded screw-threaded nut and exteriorly with a metallic strengthening-ring, as f, substantially as described.

4. A soft-metal plumber's trap the mouth of whose cleaning-out opening is provided with the embedded screw-threaded nut c and metallic retaining-washer d, forming a continuous surface of metal harder than the body of the trap, and with an exterior strengthening-ring, the upper edge of which is embedded in the soft metal of the trap, substantially as described.

Signed at New York, in the county of New York and State of New York, this 31st day of December, A. D. 1885.

GEO. W. WICKS.

Witnesses:
HUGO KOELKER,
J. E. M. BOWEN.